(12) United States Patent
Rosenbalm

(10) Patent No.: US 7,118,130 B2
(45) Date of Patent: Oct. 10, 2006

(54) ANTI-SKID TIRE CHAIN DEVICE

(75) Inventor: Ronald D. Rosenbalm, North Vernon, IN (US)

(73) Assignee: Onspot of North America, Inc., North Vernon, IN (US)

( * ) Notice: Subject to any disclaimer, the term of this patent is extended or adjusted under 35 U.S.C. 154(b) by 283 days.

(21) Appl. No.: 10/764,220

(22) Filed: Jan. 23, 2004

(65) Prior Publication Data

US 2005/0161929 A1    Jul. 28, 2005

(51) Int. Cl.
*B60S 9/00* (2006.01)
(52) U.S. Cl. ......................................... 280/757; 180/16
(58) Field of Classification Search ................ 280/757, 280/763.1; 180/16, 4 B; 301/44.1, 44.4
See application file for complete search history.

(56) References Cited

U.S. PATENT DOCUMENTS

| | | | | |
|---|---|---|---|---|
| 2,277,036 A | | 3/1942 | Chaussee ........................ 188/4 |
| 2,283,948 A | | 5/1942 | Ridgway ........................ 188/4 |
| 3,068,949 A | * | 12/1962 | Sirois ........................... 180/313 |
| 3,658,158 A | | 4/1972 | Saupp .......................... 188/4 B |
| 4,054,304 A | * | 10/1977 | Sirois ........................... 280/757 |
| 4,355,451 A | | 10/1982 | Thomas ....................... 29/426.6 |
| 4,745,993 A | * | 5/1988 | Schulz et al. ................ 188/4 B |
| 4,800,939 A | | 1/1989 | Törnebäck ................... 152/214 |
| 4,901,809 A | | 2/1990 | Tschannen .................... 180/16 |
| 5,010,982 A | | 4/1991 | Sedlmayr ..................... 188/4 B |
| 5,076,379 A | | 12/1991 | Bahr et al. ..................... 180/16 |
| 5,785,351 A | * | 7/1998 | Chang et al. ................ 280/757 |
| 6,062,348 A | * | 5/2000 | Atkinson, Jr. ............... 188/4 B |
| 6,561,489 B1 | | 5/2003 | Wakefield .................... 254/323 |
| 6,830,134 B1 | * | 12/2004 | Choi ........................... 188/4 B |

FOREIGN PATENT DOCUMENTS

| | | |
|---|---|---|
| DE | 34 40 951 A1 | 5/1986 |
| DE | 3842 502 A1 | 5/1989 |
| DE | 198 01 237 A1 | 7/1999 |
| EP | 0 487 297 A1 | 5/1992 |
| EP | 0 569 111 A1 | 11/1993 |

* cited by examiner

*Primary Examiner*—David R. Dunn
*Assistant Examiner*—Leonard J. McCreary, Jr.
(74) *Attorney, Agent, or Firm*—Woodard, Emhardt, Moriarty, McNett & Henry LLP

(57) ABSTRACT

An anti-skid device for use in cooperation with a vehicle wheel for positioning a traction member beneath the vehicle wheel includes a frame assembly constructed and arranged to be attached to the vehicle, a swing arm pivotally connected to the frame, and an electric, linear actuator having an extendable shaft. The anti-skid device includes a double pivot link where one end is attached to the frame assembly and the opposite end is attached to the swing arm. The linear actuator is attached to a movable pressure plate and a biasing spring is positioned between the movable pressure plate and a back plate for applying and maintaining contact pressure of the traction wheel against the vehicle wheel. In the preferred embodiment, the traction member is a length of chain that is connected to the traction wheel for positioning between the vehicle wheel and the road surface.

21 Claims, 20 Drawing Sheets

ANTI-SKID TIRE CHAIN DEVICE

BACKGROUND OF THE INVENTION

The present invention relates in general to anti-skid devices for vehicles. More specifically, the present invention relates to a device that provides a rotatable member with links of chain, or other traction or friction increasing means, intended to be thrown sequentially under a wheel of a vehicle for increased traction between the wheel and the road surface. One device of the type generally described above is disclosed in U.S. Pat. No. 4,800,939 to Törnebäck.

The Törnebäck device utilizes an inflatable bellows to extend the movable arm that includes the pulley. It is important to note that a supply source of air for the bellows is required in order for the Törnebäck device to be operable. A suitable supply of air is likely available with larger vehicles such as semi-tractor trailers. Smaller passenger vehicles such as SUVs and trucks are not likely to have a suitable air supply. Another consideration with smaller passenger vehicles of the type described is the available space within and/or beneath the frame for securing an anti-skid device in position.

As described in the '939 patent, devices of this kind typically include a pulley provided with strands or links of chain or some other friction increasing means for sequentially positioning the chain beneath the vehicle wheel between the wheel and the road surface. Devices of this kind are not as simple to construct as would appear from the principle itself. Chains, pulleys, and other supports are, to start with, subject to very substantial forces necessitating heavy duty construction. Furthermore, a relatively large movement is required to displace the chain carrying pulley between its working position in contact with the vehicle wheel and its operative stored or stowed position. To store the pulley is particularly troublesome since different cars and passenger vehicles have different available places for the pulley. Furthermore, the pulley should be sufficiently elevated so that the chains attached to the pulley or chain wheel do not drag on the ground as this causes the links of chain to be worn prematurely. A result of the above requirements and problems that need to be solved with automatic anti-skid devices of the type described is that they are comparatively costly to produce which in turn results in a number of individuals being reluctant to obtain these safety increasing aids.

While the present invention is directed to solving some of the same problems mentioned in the '939 patent, an additional constraint has been added. This additional constraint is to design a suitable device that does not require a source or supply of air. The present invention has achieved a solution to this design challenge in a novel and unobvious manner.

SUMMARY OF THE INVENTION

An anti-skid device for use in cooperation with a vehicle wheel for positioning a traction member beneath the vehicle wheel according to a typical embodiment of the present invention includes a frame assembly that is constructed and arranged to be attached to the vehicle, a swing arm that is pivotally connected to the frame assembly by way of a double pivot link, the swing arm including a traction wheel with at least one traction member thereon, and an electric linear actuator having an extendable shaft is assembled to the swing arm by way of a connector wherein extension of the shaft deploys the swing arm such that the traction wheel is placed against the vehicle wheel.

One object of the present invention is to provide an improved anti-skid device.

Related objects and advantages of the present invention will be apparent from the following description.

DESCRIPTION OF THE PREFERRED EMBODIMENTS

Figure 1:
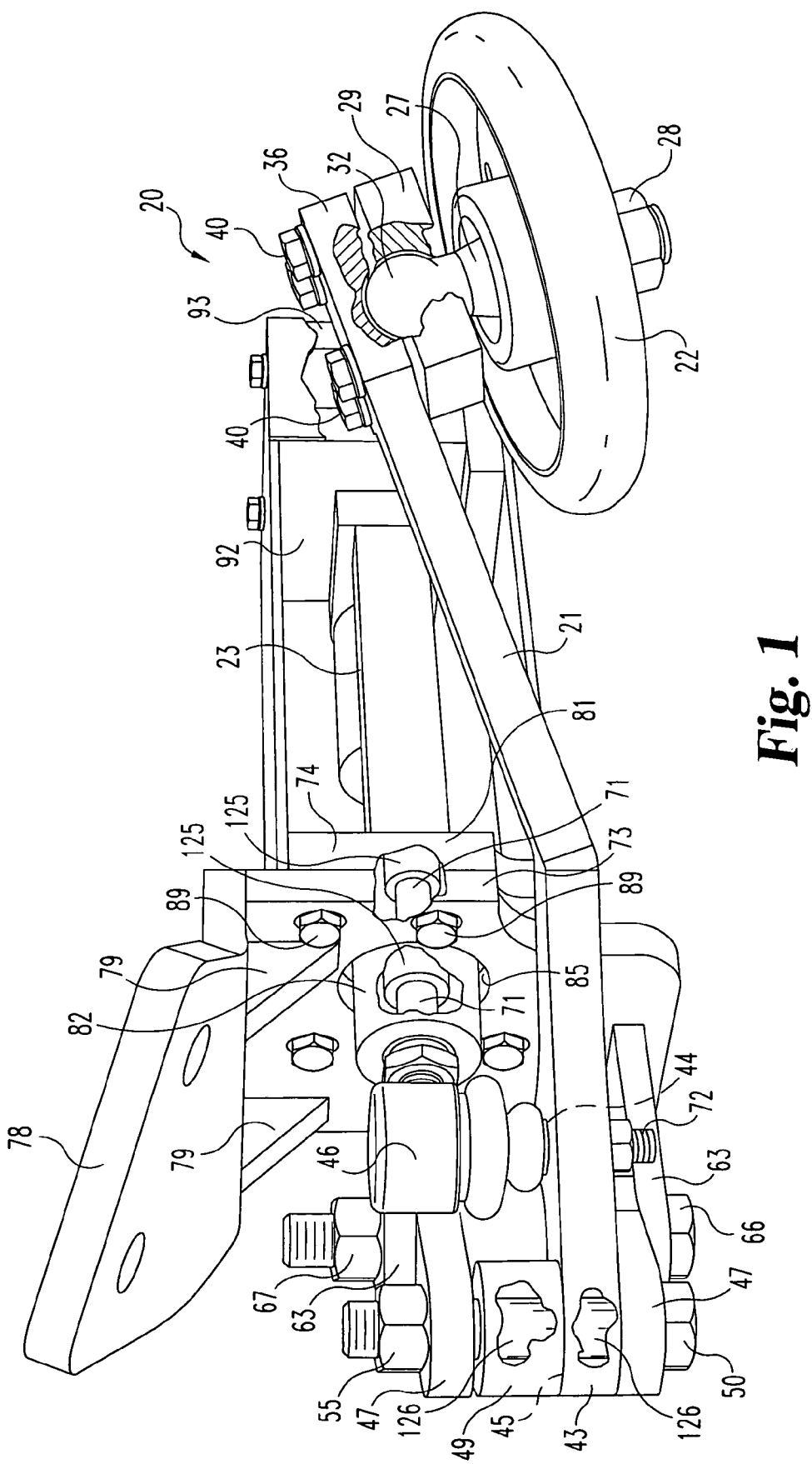
FIG. 1 is a fragmentary, perspective view of an anti-skid device according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated, as a perspective view, anti-skid device 20 that is constructed according to one embodiment of the present invention. Device 20 includes a movable swing arm 21 to which is affixed a chain wheel 22. Device 20 further includes an electric linear actuator 23 that is positioned within and secured to a housing assembly comprising a number of component parts as will be described herein. Chain wheel 22 is constructed and arranged to receive links of chain (not illustrated) or similar traction increasing devices that are in turn to be thrown under a vehicle wheel, sequentially, (see FIG. 5) in order to provide improved traction for the vehicle wheel against the road surface.

A number of other components are included and assembled as illustrated in FIG. 1 in order to complete the construction of device 20. These other components are identified and described hereinafter, some of which are the subject of individual drawing figures illustrations, such as in FIGS. 10–22 and FIG. 24.

Figure 2:
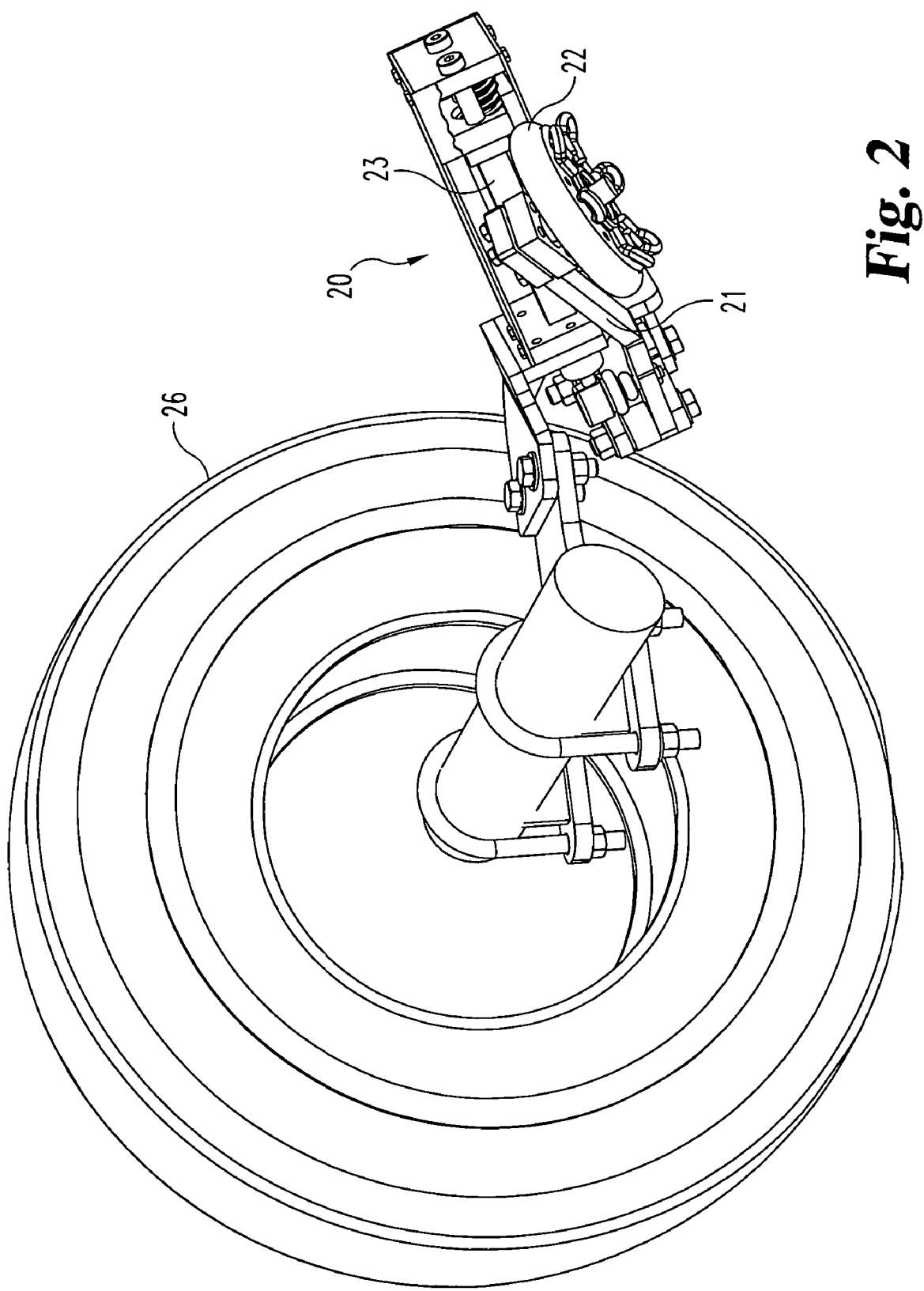
FIG. 2 is a perspective view of the FIG. 1 device as mounted to a wheel axle according to the present invention.
Figure 3:
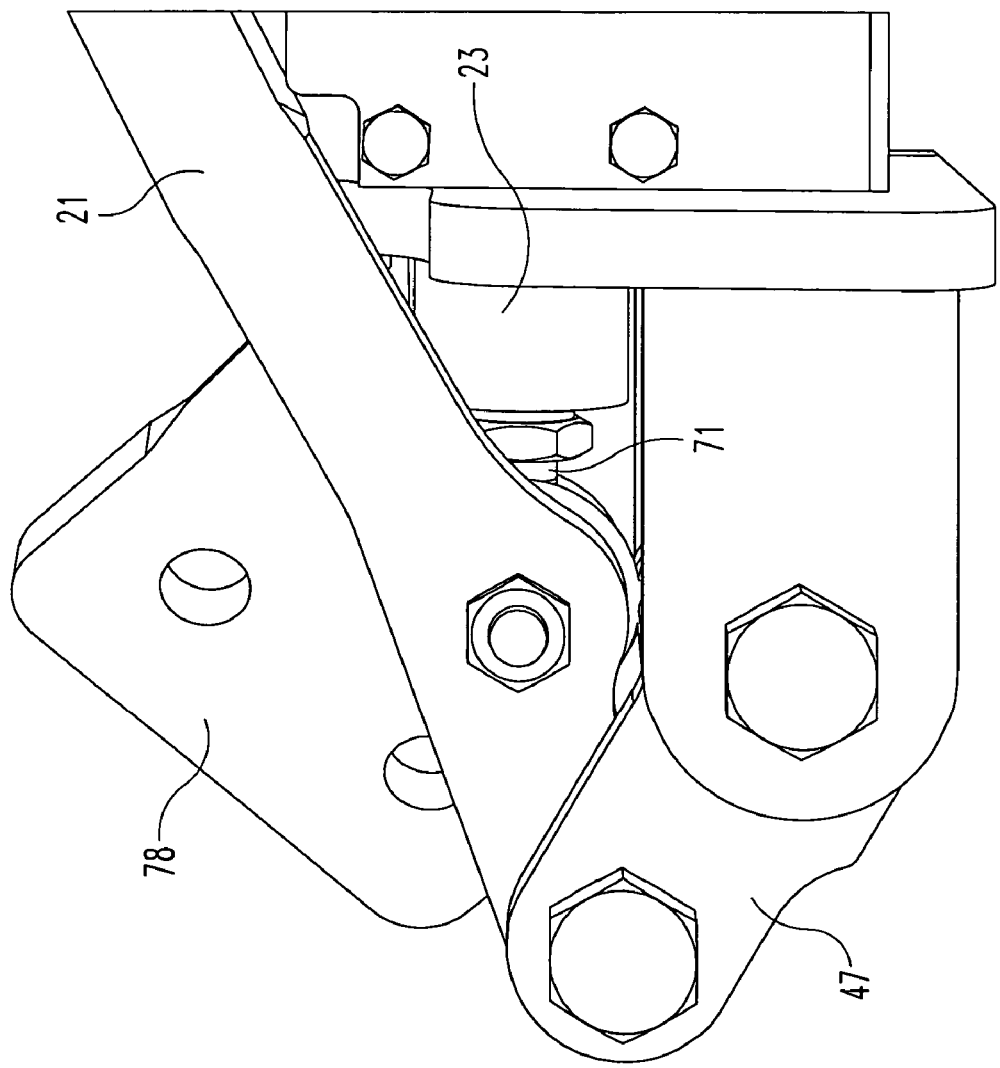
FIG. 3 is a partial, top plan view of the FIG. 1 device in a stored position.
Figure 4:
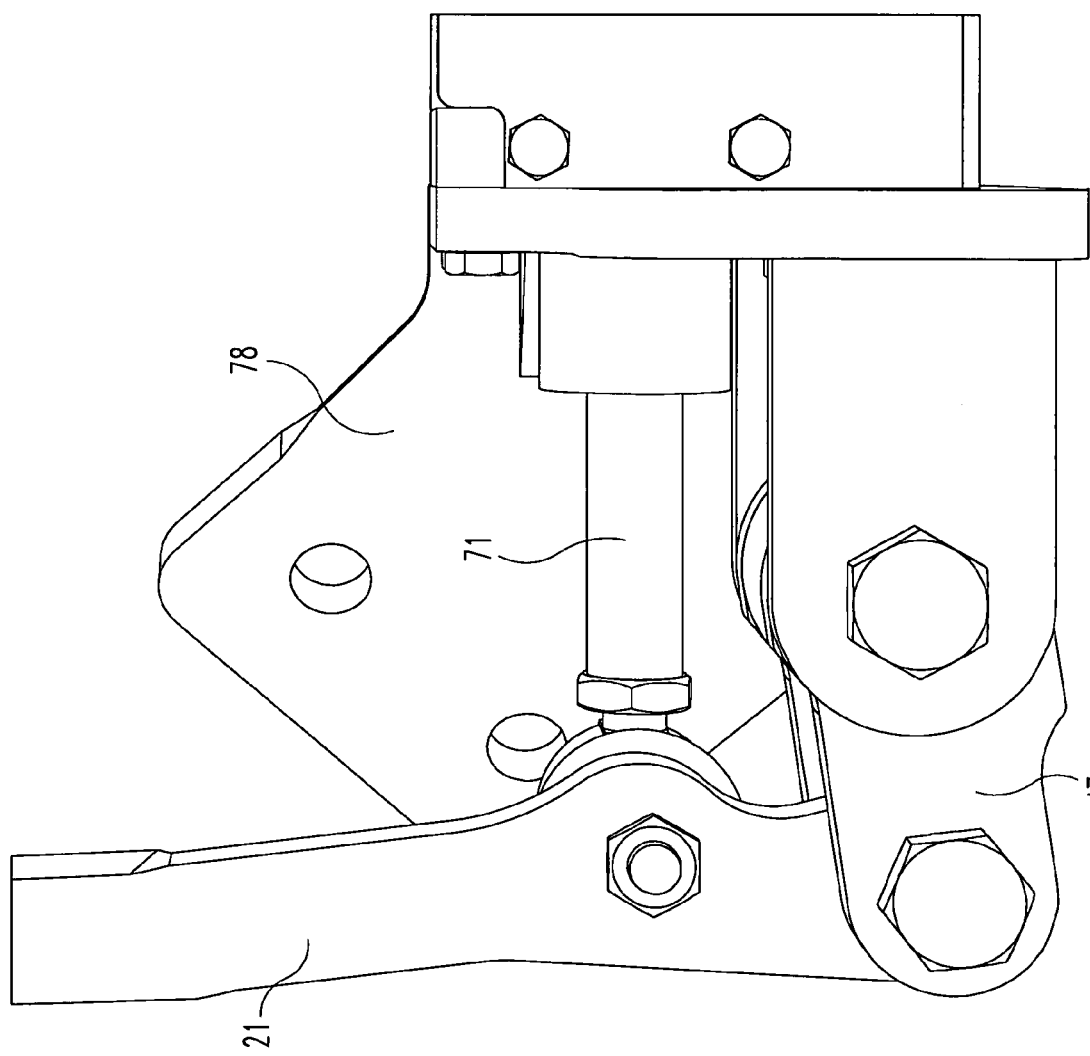
FIG. 4 is a partial, top plan view of the FIG. 1 device at an approximate midpoint position in its deployment cycle.
Figure 5:
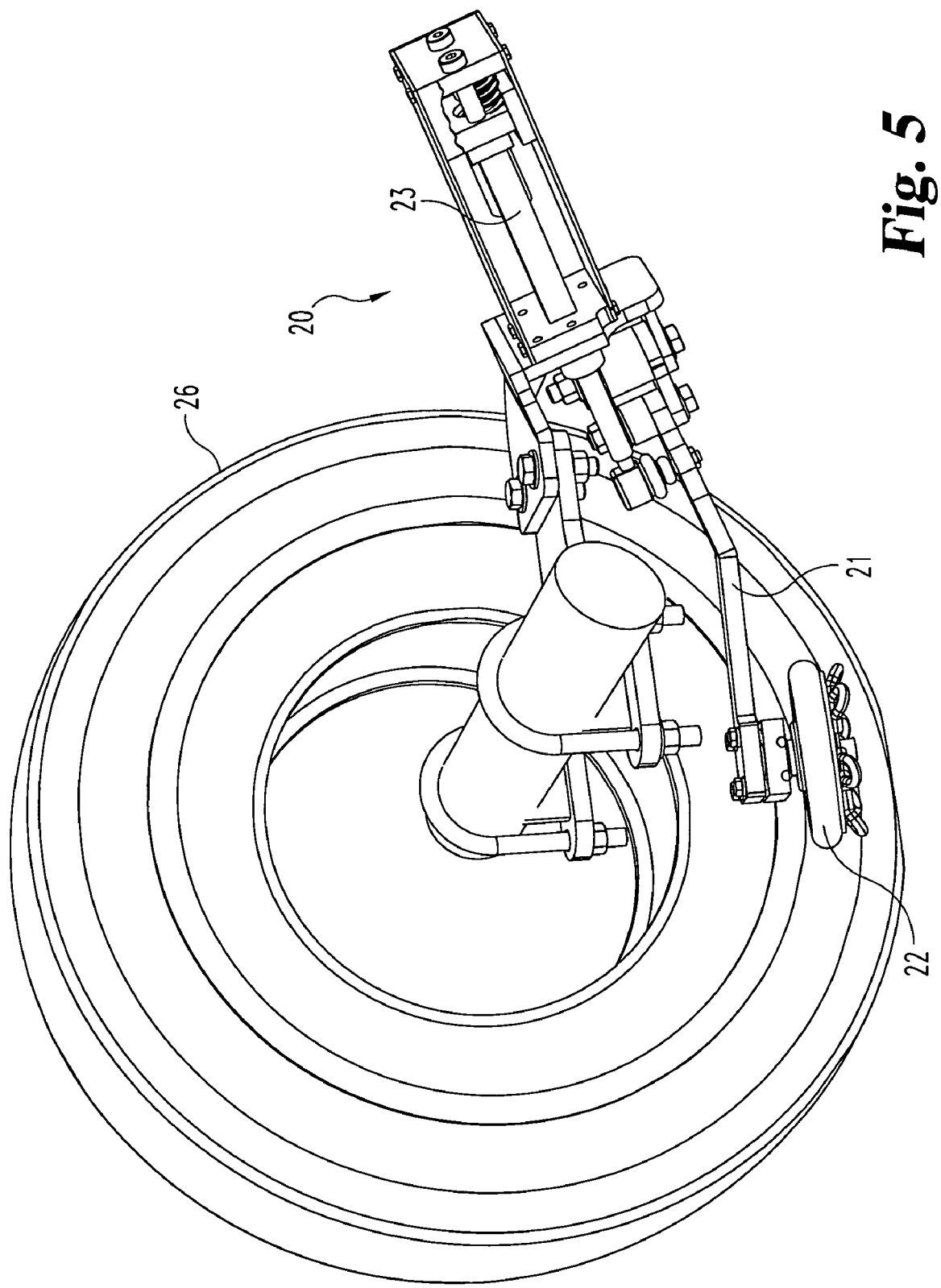
FIG. 5 is a perspective view of the FIG. 1 device in its fully extended, working position making contact with the vehicle wheel.
Figure 6:
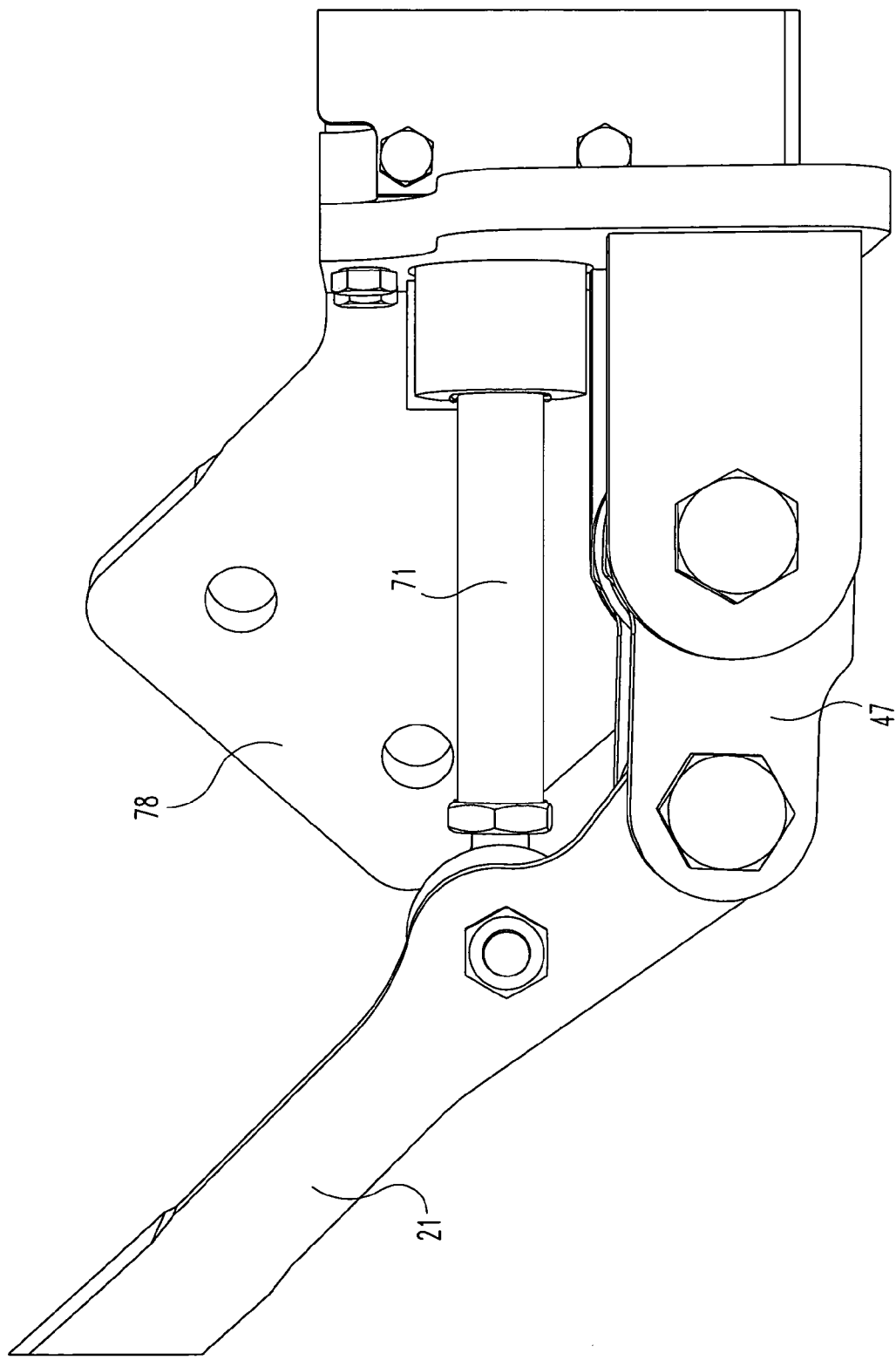
FIG. 6 is a partial, top plan view of the FIG. 1 device in the extended, working position.
Figure 7:
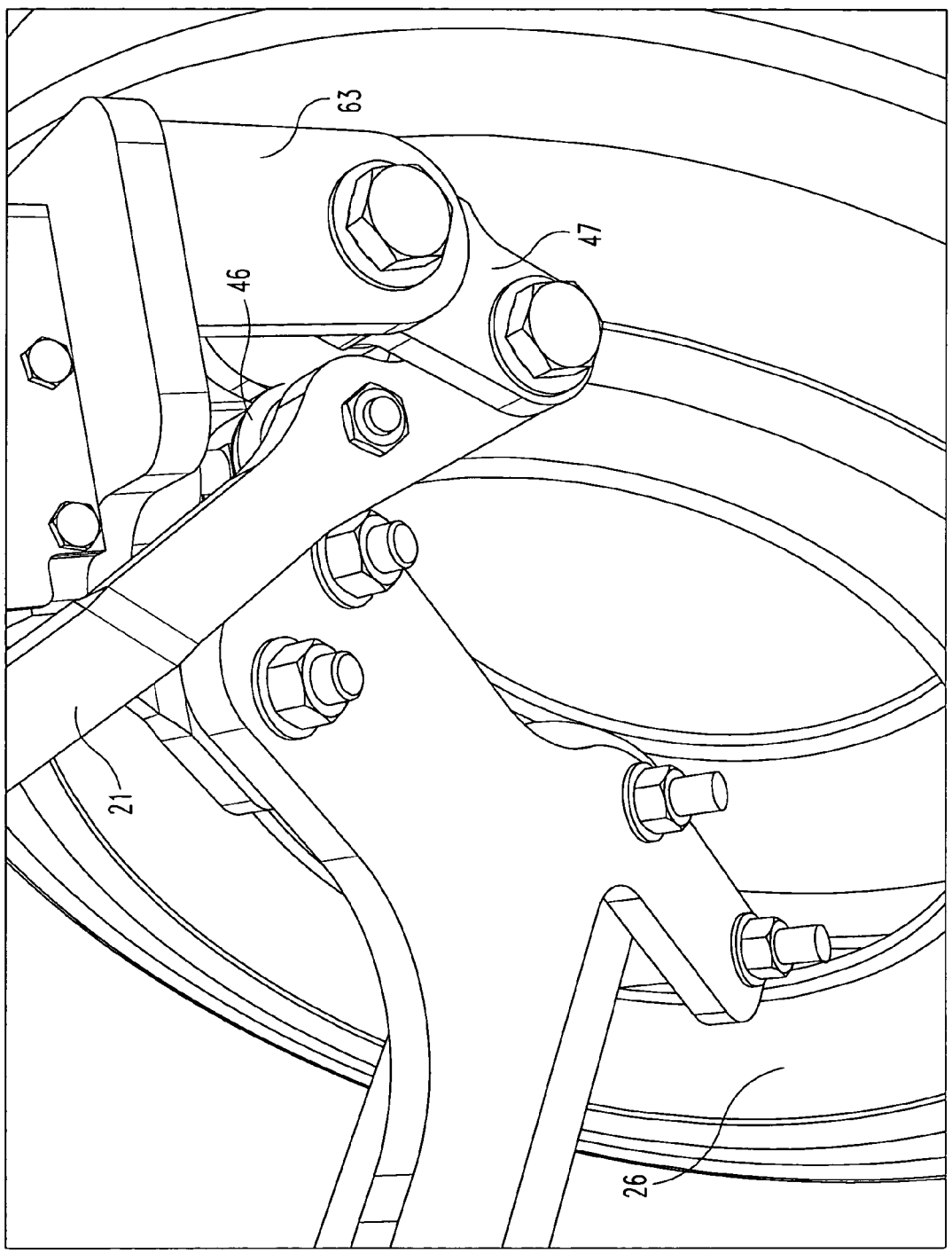
FIG. 7 is a partial, perspective view of a double pivot linkage comprising a portion of the FIG. 1 device with the device in a stored position.
Figure 8:
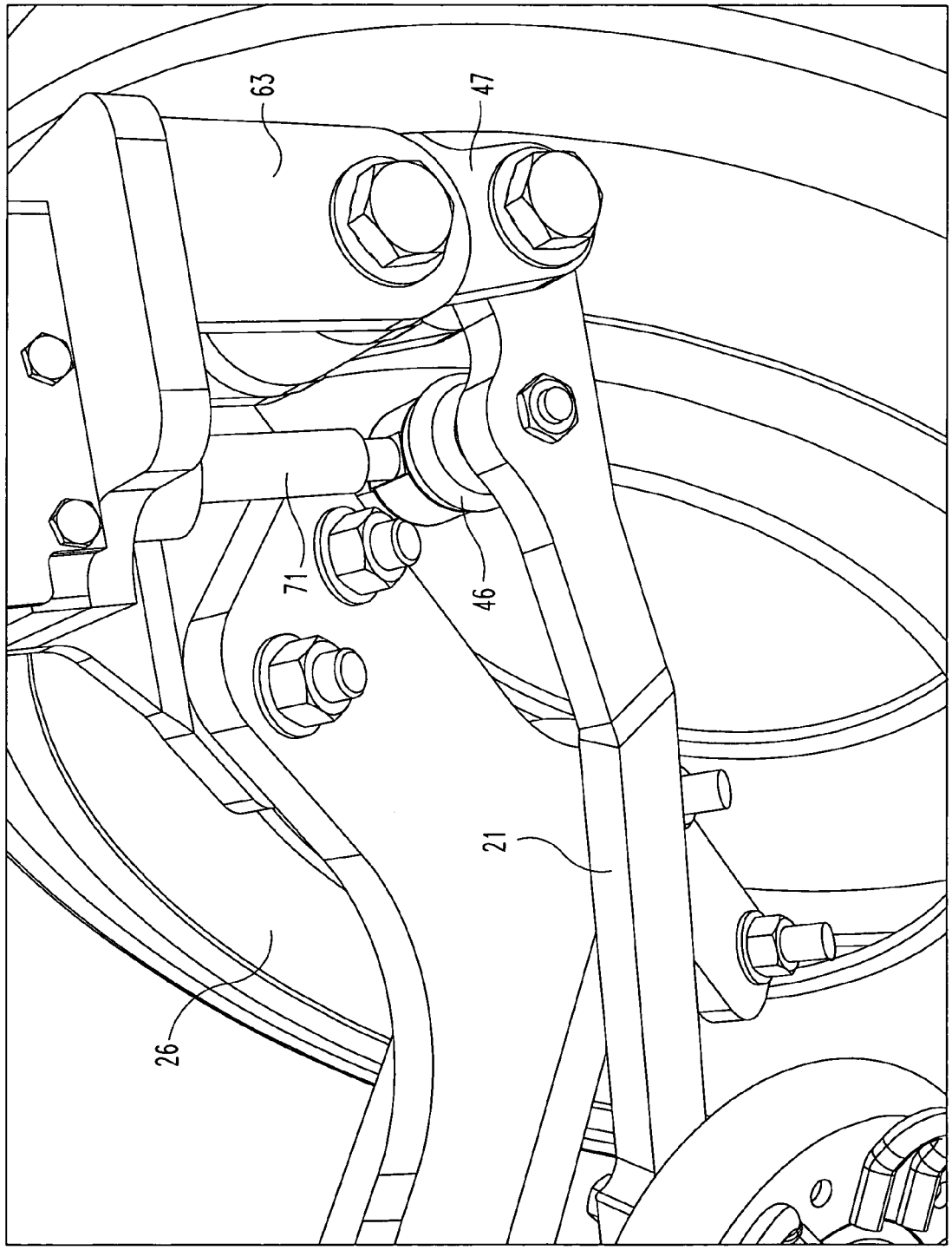
FIG. 8 is a partial, perspective view of the FIG. 7 double pivot linkage at a midpoint position in its deployment cycle.
Figure 9:
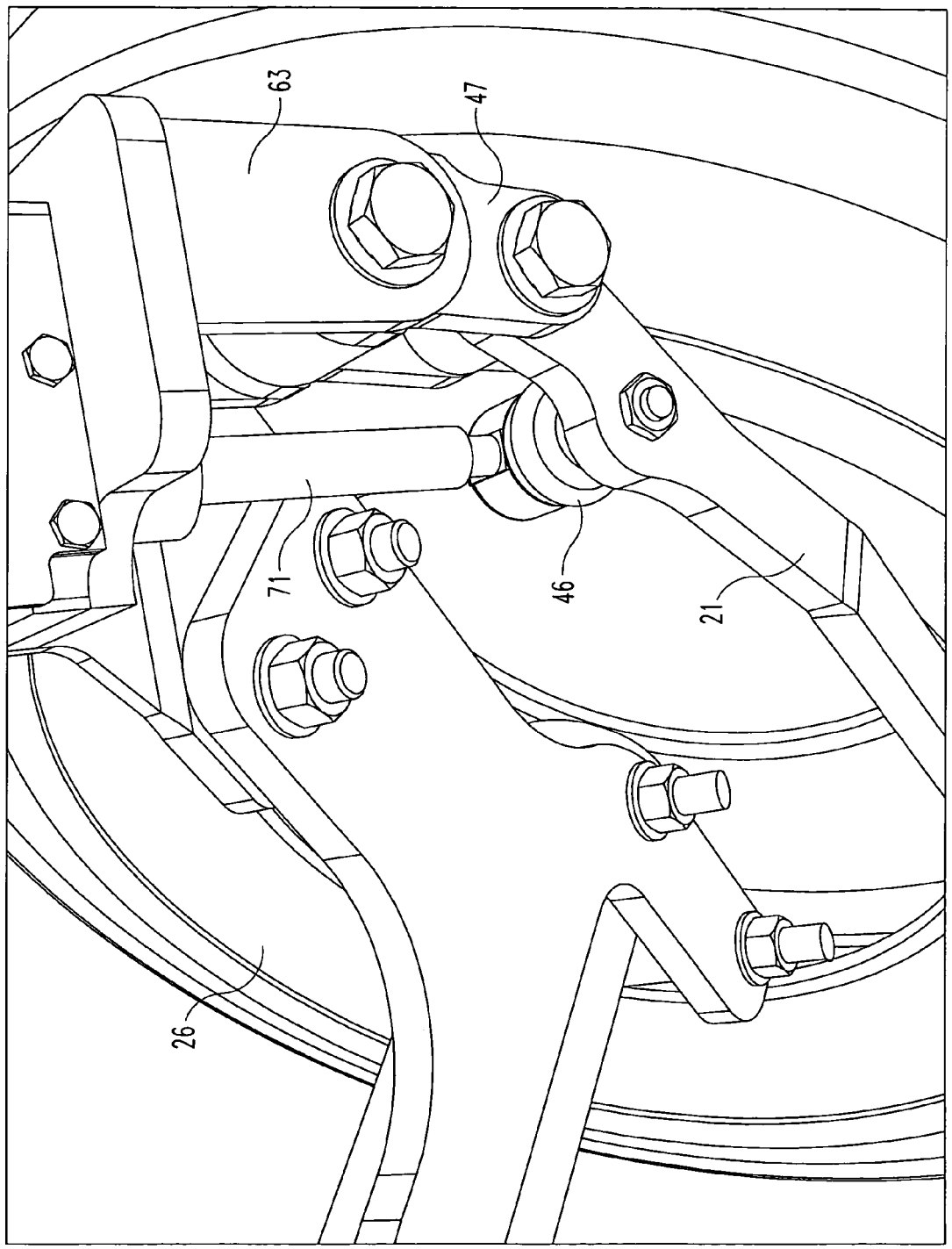
FIG. 9 is a partial, perspective view of the FIG. 7 double pivot linkage in the working or extended position.

In operation, device 20 causes the swing arm 21 to pivot from a retracted or stowed position (see FIGS. 2 and 3) to an extended or working position (see FIGS. 5 and 6). FIG. 4 illustrates an intermediate or mid-point position in the deployment cycle of the chain wheel 22. Movement of the swing arm 21 in the manner illustrated and described causes the chain wheel 22 to swing from its retracted or stowed position into a contact or working position against a wheel 26 of the vehicle that receives device 20. As is illustrated in FIG. 2, device 20 is secured to the vehicle wheel axle in order to properly position device 20 for its intended operation. Alternative mounting locations and arrangements are envisioned within the scope of the present invention, depending on the vehicle specifics. The rotation of wheel 26 drives chain wheel 22, similar to a gear set. The rotation of chain wheel 22 causes the links of chain (not illustrated) that are attached to the chain wheel to sequentially be thrown beneath wheel 26, between wheel 26 and the road surface. This in turn provides increased traction between wheel 26 and the road surface. One of the important features of the present invention is the use of a double pivot linkage in order to obtain the required deployment motion for the swing arm and chain wheel 22 using an electric, linear actuator 23. The various stages for this double pivot linkage are illustrated in FIGS. 7–9.

Figure 10:
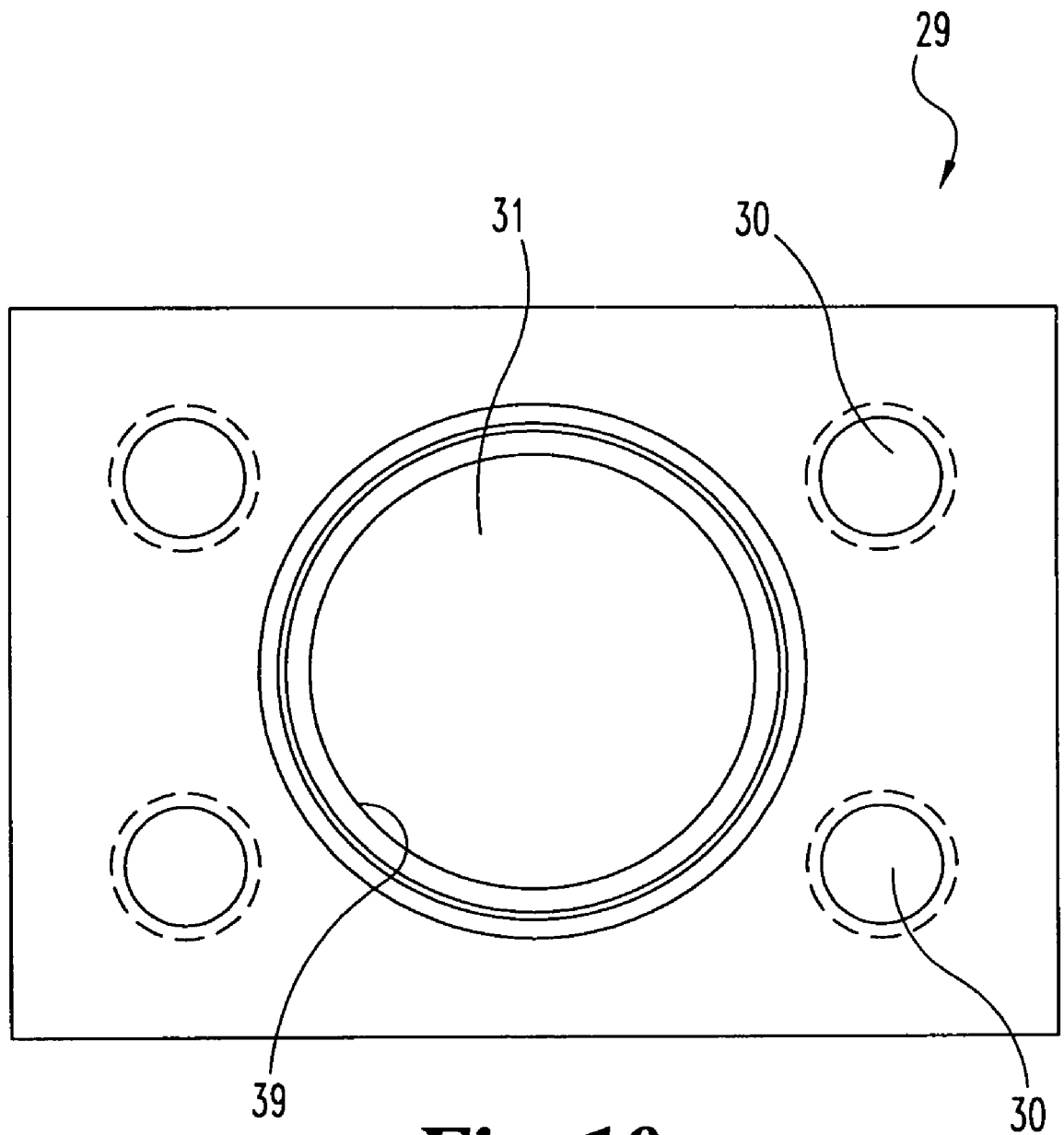
FIG. 10 is a top plan view of a receiver comprising a portion of the FIG. 1 device.
Figure 11:
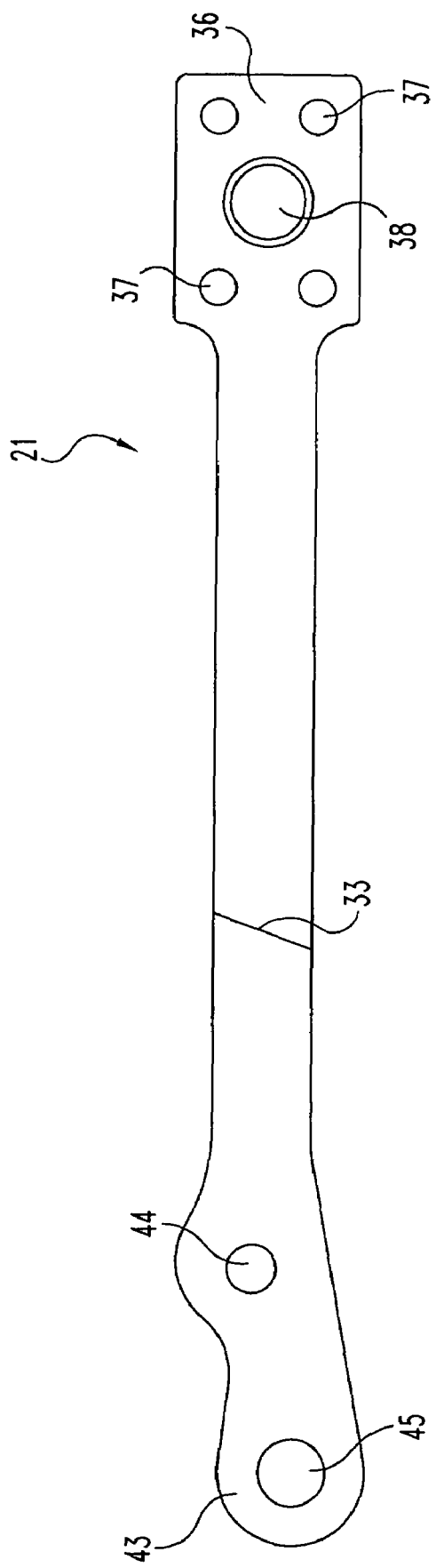
FIG. 11 is a top plan view of a swing arm comprising a portion of the FIG. 1 device.
Figure 12:
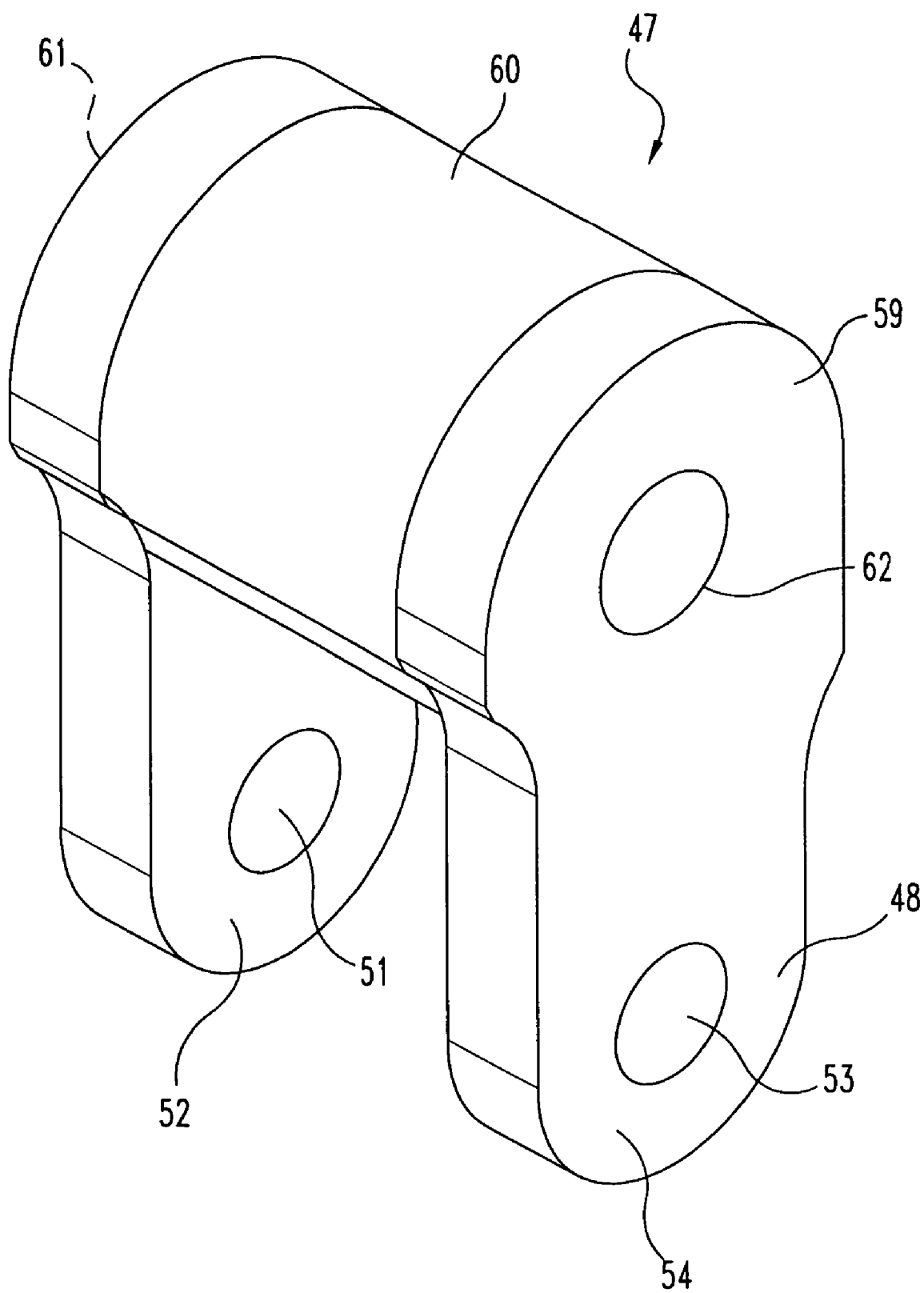
FIG. 12 is a perspective view of a double pivot comprising a portion of the FIG. 1 device.
Figure 13:
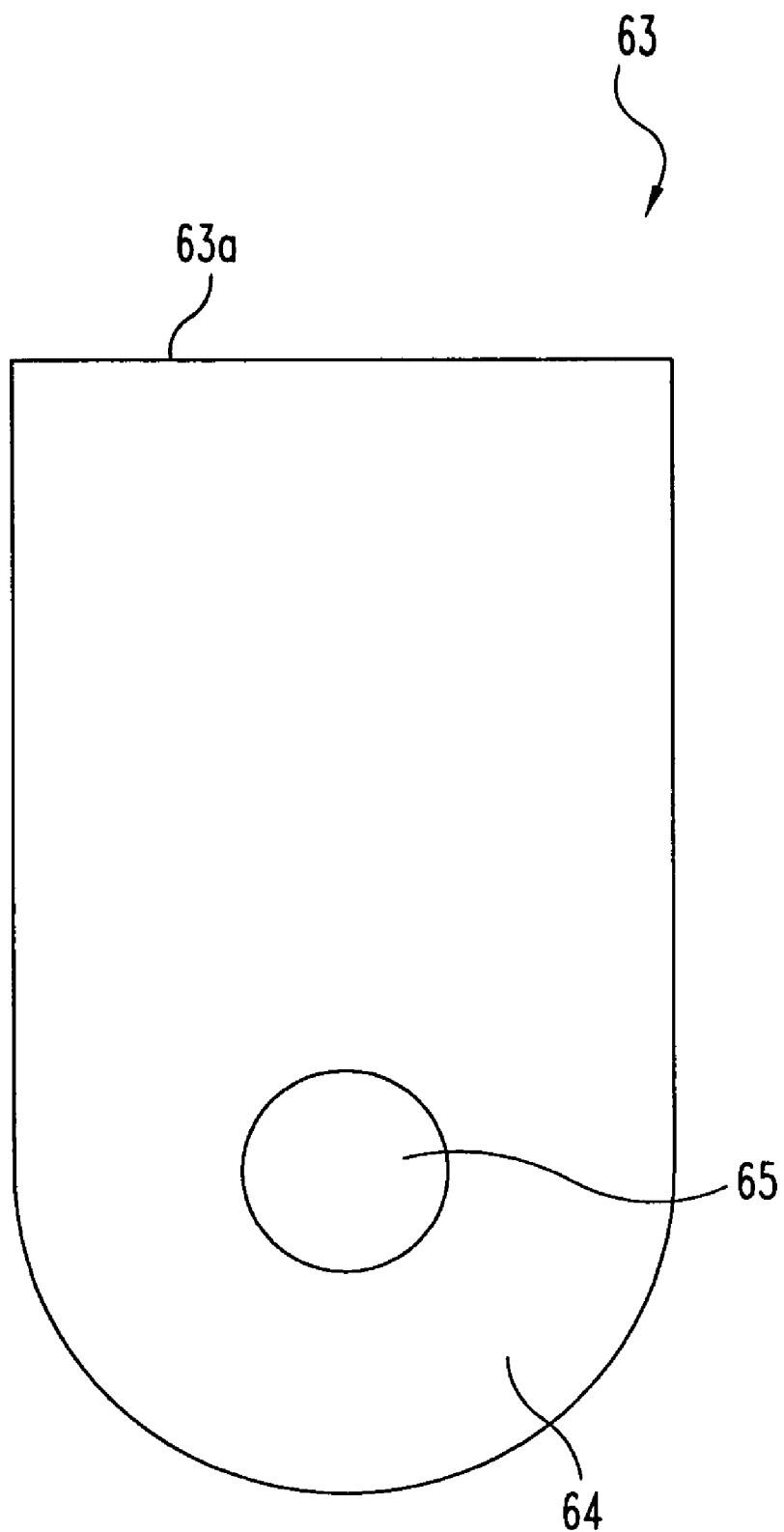
FIG. 13 is a top plan view of a pivot ear comprising a portion of the FIG. 1 device.
Figure 14:
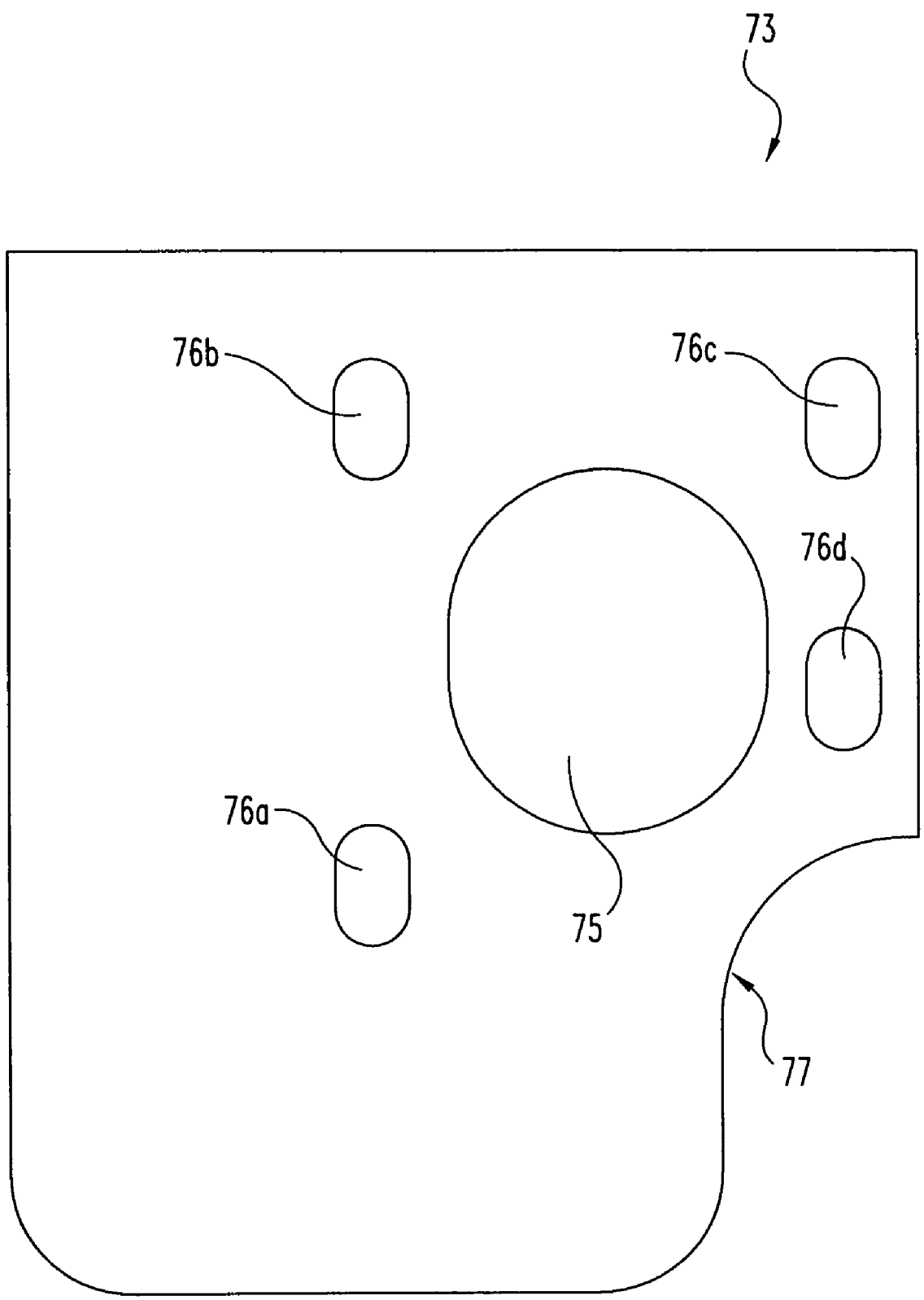
FIG. 14 is a front elevational view of a unit mount comprising a portion of the FIG. 1 device.
Figure 15:
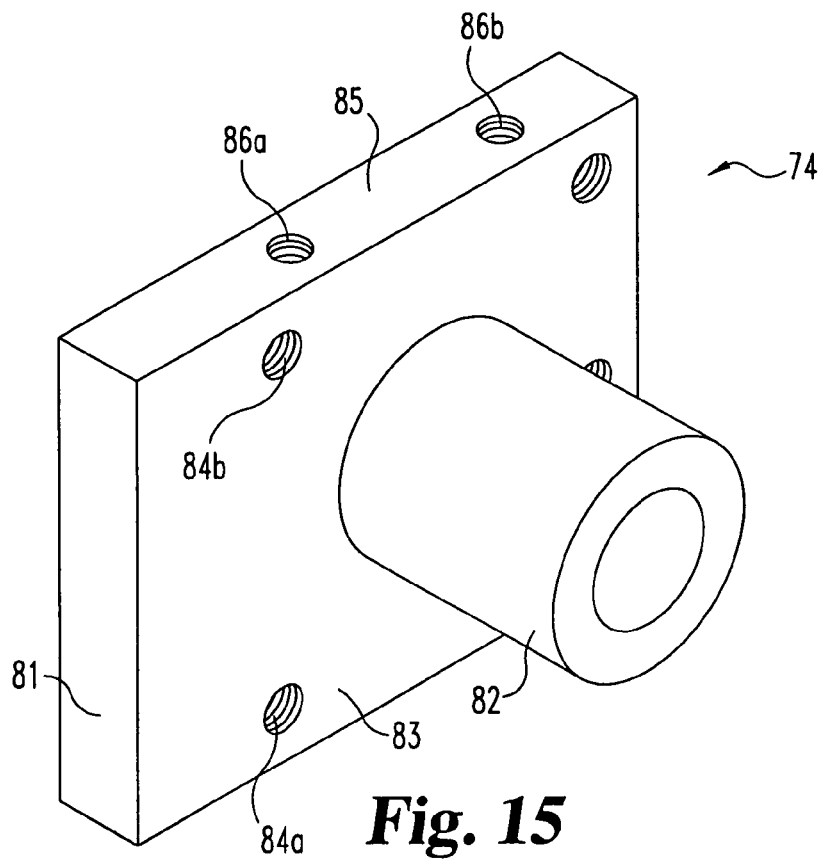
FIG. 15 is a perspective view of a front guide plate comprising a portion of the FIG. 1 device.
Figure 16:
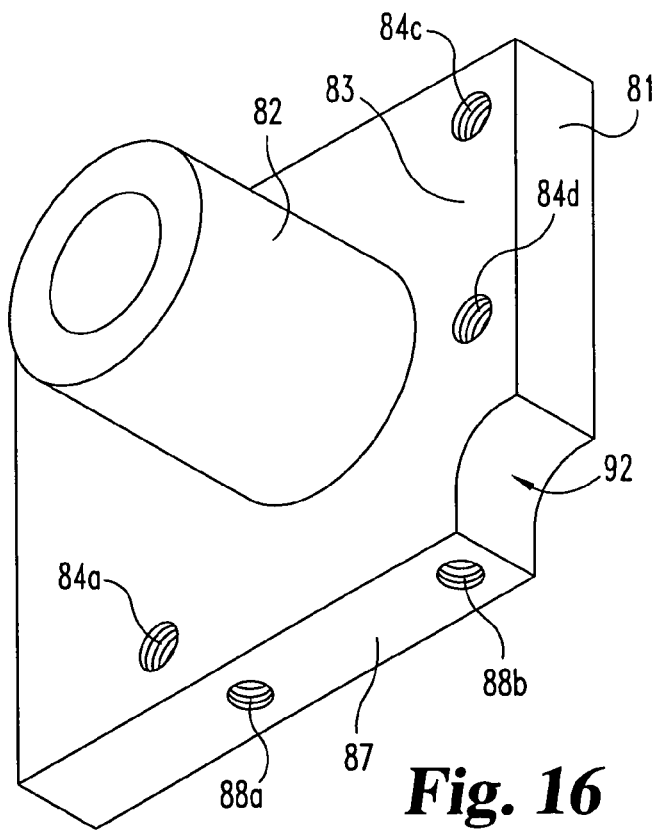
FIG. 16 is a perspective view of the FIG. 15 front guide plate.
Figure 17:
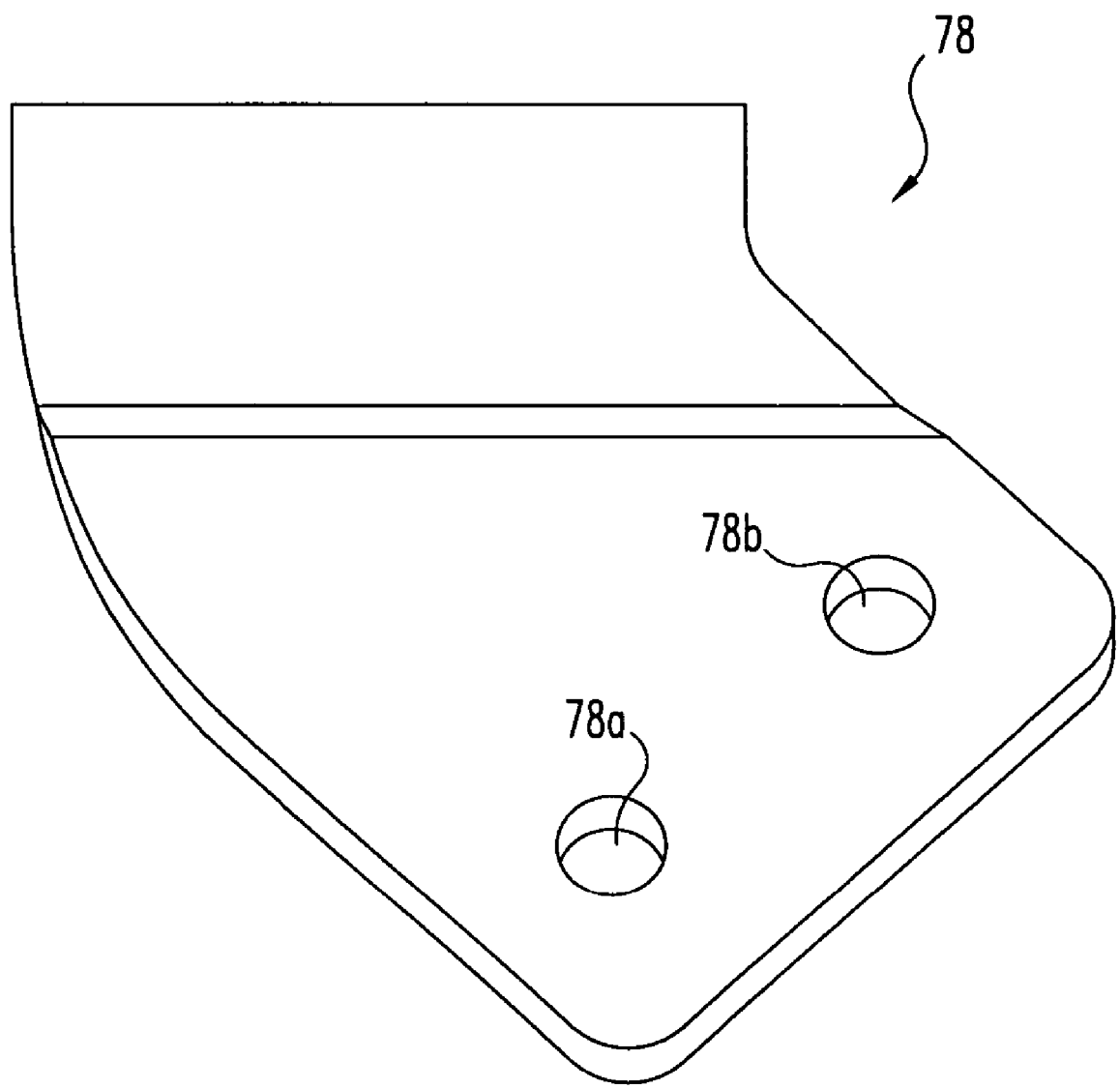
FIG. 17 is a perspective view of a mounting plate comprising a portion of the FIG. 1 device.

With continued reference to FIG. 1, device 20 further includes a chain wheel bolt 27 that extends through the chain wheel 22 and is secured on one side by hex nut 28 and is captured on the opposite side by receiver 29, see FIG. 10. Receiver 29 includes four internally-threaded bolt holes 30 and a center bore 31 that receives the enlarged spherical head 32 of the chain wheel bolt 27. The details of swing arm 21 are illustrated in FIG. 11. The bend in the swing arm 21, as illustrated in FIG. 1, coincides with the location of line 33 in FIG. 11. End 36 defines four clearance holes 37 and the pattern spacing corresponds to the four hole pattern spacing in receiver 29. The center bore 38 is aligned with center bore 31 but center bore 38 is smaller since it is constructed and arranged to provide clearance for only the top portion of the spherical head 32.

The inner surface of center bore 31 of receiver 29 includes a radially inwardly extending rib 39 that seats spherical head 32 of bolt 27. This rib 39 prevents further movement of the chain wheel bolt 27 through receiver 29 in the direction of chain wheel 22. In order to prevent movement of the chain wheel bolt 27 in the direction of swing arm 21, end 36 is bolted to receiver 29 using the four clearance holes 37 and bolt holes 30 for the four hex head bolts 40 (see FIG. 1). Bolting the swing arm 21 onto receiver 29 utilizes the smaller diameter of center bore 38 to capture the free end (spherical head 32) of chain wheel bolt 27.

The opposite end 43 of swing arm 21 includes two spaced apart clearance holes 44 and 45. These two clearance holes 44 and 45 cooperate with angle joint 46 (hole 44) and with double pivot 47 (hole 45). The design and construction of double pivot 47 is illustrated in greater detail in FIG. 12. The smaller end 48 of double pivot 47 receives end 43 and bushing 49. A cap screw 50 extends through clearance hole 51 in one flange 52 of double pivot 47, through hole 45 in swing arm 21, through bushing 49, and through clearance hole 53 in the opposite flange 54 of double pivot 47. The free end of cap screw 50, as extending through this stack of parts, is secured by hex nut 55.

The opposite end 59 of double pivot 47 includes a hollow cylindrical spacer 60 and aligned clearance holes 61 (in flange 52) and 62 (in flange 54). End 59 is positioned between a pair of pivot ears 63 (see FIG. 13). The radiused end 64 of pivot ear 63 defines a clearance hole 65 that is used in cooperation with cap screw 66 and hex nut 67 to assemble the two pivot ears 63 to double pivot 47. Clearance holes 65 are aligned with clearance holes 61 and 62 and cap screw 66 is inserted through the stack of component parts. Each pivot ear 63 is welded to the front surface of unit mount 73 along the flat edge 63a. In order to secure the assembly, the hex nut 67 is threaded onto the free end of cap screw 66.

Angle joint 46 is connected to the movable piston shaft 71 of the electric, linear actuator 23. The support post 72 of angle joint 46 is inserted through clearance hole 44 in swing arm 21 and secured by a hex nut. Piston shaft 71 extends through a stacked assembly of flat plates including unit mount 73 (see FIG. 14) and front guide plate 74 (see FIGS. 15 and 16 ). Unit mount 73 includes an oblong clearance aperture 75 and four smaller oblong clearance openings 76a–76d. Unit mount 73 is a substantially flat plate with a uniform thickness. Peripheral relief 77 is provided for clearance with swing arm 21. Mounting plate 78 (see FIG. 17) is rigidly attached to unit mount 73 as illustrated in FIG. 1. Preferably, mounting plate 78 is welded to the front surface of unit mount 73 in order to provide the desired rigid connection. This particular mounting includes the use of two triangular corner gussets 79. Front guide plate 74 is a unitary component that includes a substantially flat panel 81 of uniform thickness and tubular sleeve 82 arranged normal to surface 83 and extending away from surface 83. Panel 81 includes four internally-threaded bolt holes 84a–84d extending through panel 81. Upper edge surface 85 includes two internally-threaded mounting holes 86a and 86b. Lower edge surface 87 includes two internally-threaded mounting holes 88a and 88b. The location spacing of holes 86a and 86b are the same as and aligned with holes 88a and 88b, respectively.

As illustrated in FIG. 1, sleeve 82 extends through aperture 85 in the direction of angle joint 46. Further, clearance openings 76a–76d are aligned with bolt holes 84a–84d. Bolts 89 are used to attach unit mount 73 to front guide plate 74. Each bolt 89 extends through a corresponding clearance hole 76a–76d and is threadedly received by a corresponding one of the bolt holes 84*a*–84*d*. The outer periphery of panel 81 includes relief area 92 in one corner for clearance with swing arm 21.

Figure 18:
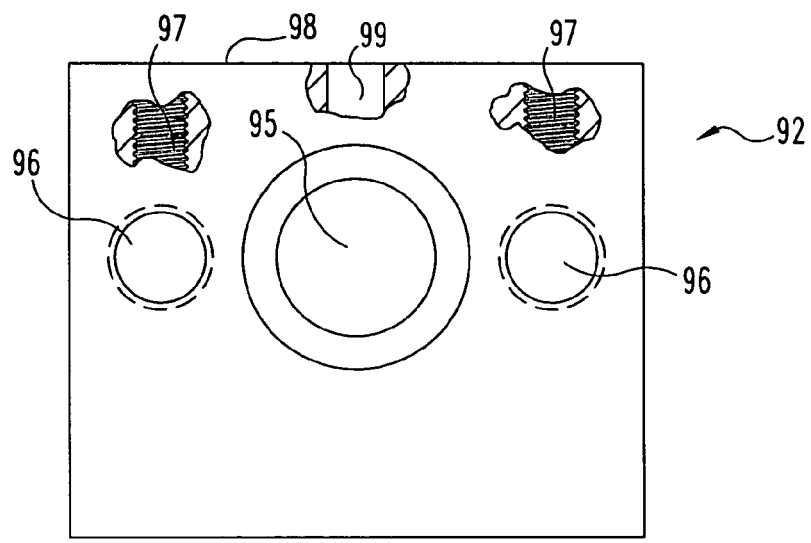
FIG. 18 is a front, elevational view of a pressure plate comprising a portion of the FIG. 1 device.
Figure 19:
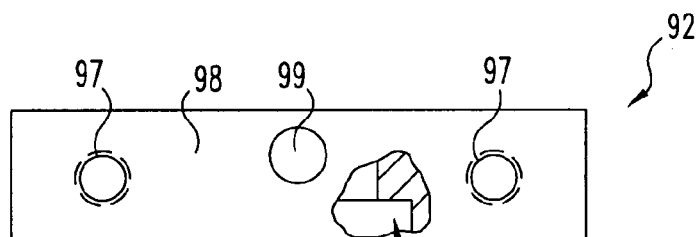
FIG. 19 is a top plan view of the FIG. 18 pressure plate.
Figure 20:
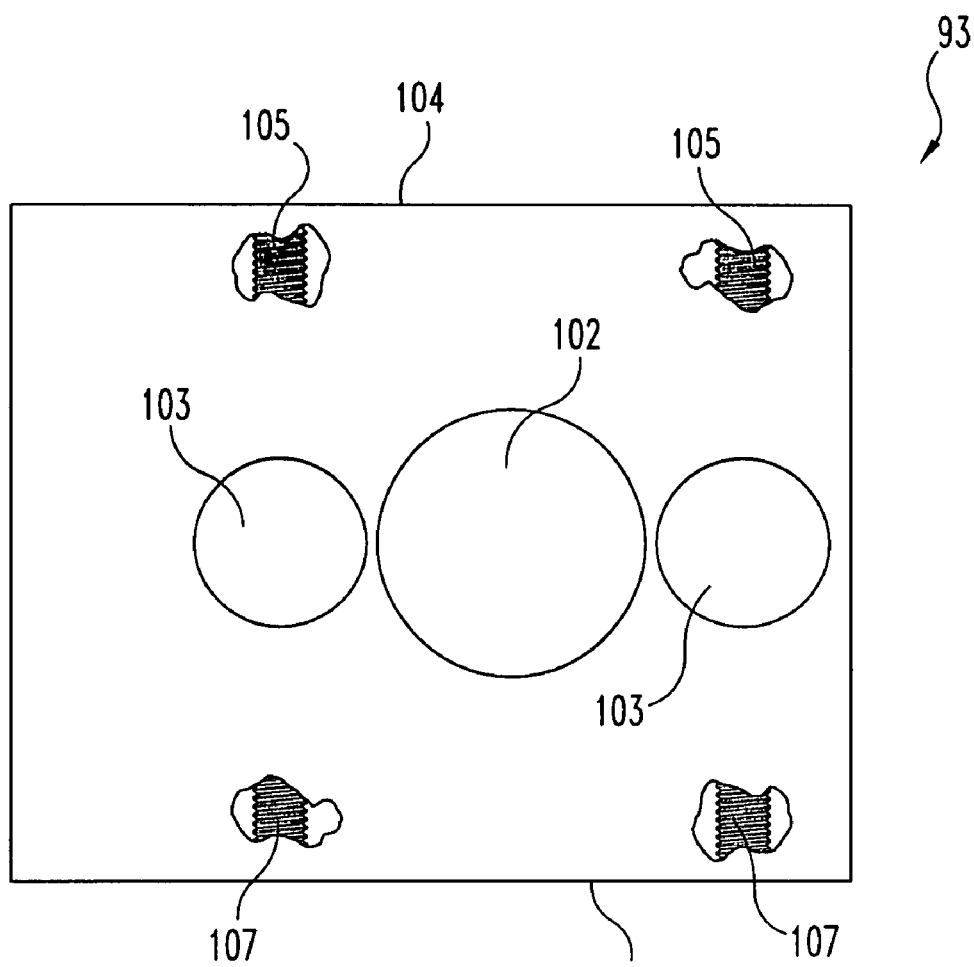
FIG. 20 is a front elevational view of a back plate comprising a portion of the FIG. 1 device.
Figure 21:
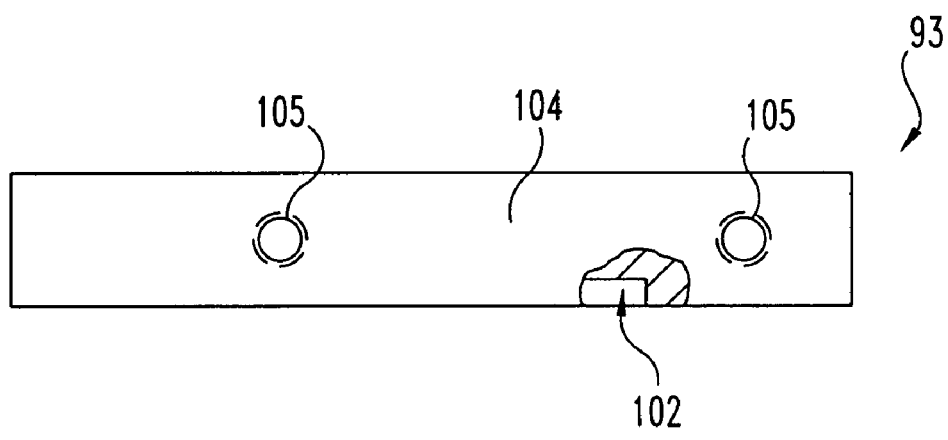
FIG. 21 is a top plan view of the FIG. 20 back plate.

As illustrated in FIG. 1, the assembled combination of the unit mount 73 and the front guide plate 74 is positioned at one end of linear actuator 23. At the opposite end of the linear actuator 23 (see FIG. 23) there is an assembled combination of a pressure plate 92, back plate 93, and pressure plate base 94. The details of pressure plate 92 are illustrated in FIGS. 18 and 19. The details of back plate 93 are illustrated in FIGS. 20 and 21. The details of pressure plate base 94 are illustrated in FIG. 22.

Referring first to FIGS. 18 and 19, it will be seen that the pressure plate 92 includes a counterbored center hole 95, two internally-threaded holes 96 equally spaced on opposite sides of the axis of hole 95, and two internally-threaded holes 97 in peripheral edge 98, also equally spaced on opposite sides of the axis of hole 95. Centered width-wise in peripheral edge 98 is a pin bore 99 that extends through pressure plate 92 and is centered so as to intersect the axis of center hole 95. As will be explained hereinafter, the selected electric, linear actuator 23 includes a mounting post that is pinned in position. This mounting post fits into hole 95 with a sliding fit. A pin hole in the mounting post is aligned with pin bore 99 and a generally cylindrical pin is used to anchor the linear actuator to pressure plate 92.

Referring to FIGS. 20 and 21, it will be seen that back plate 93 includes a shallow, blind hole 102 and a pair of clearance holes 103 that are aligned with and equally spaced on opposite sides of the axis of hole blind 102. Upper edge surface 104 includes two internally-threaded holes 105. Lower edge surface 106 includes two internally-threaded holes 107. Each hole 105 is axially aligned with a corresponding one of holes 107. Each hole 103 provides clearance for the body of a shouldered cap screw 108 that is received by a corresponding one of threaded holes 96 in pressure plate 92. The blind hole 102 receives one end of a biasing spring 109 and the opposite end of the biasing spring is received in the counterbored portion of hole 95 in pressure plate 92. Accordingly, this arrangement seats the biasing spring 109 between the back plate 93 and the pressure plate 92 (see FIG. 23).

Figure 22:
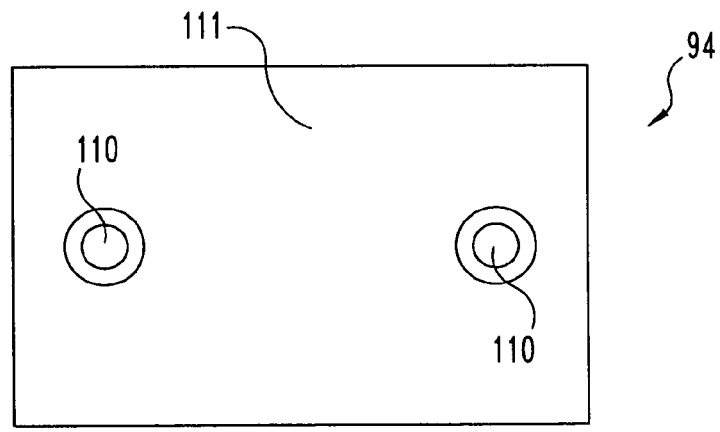
FIG. 22 is a bottom plan view of a pressure plate base comprising a portion of the FIG. 1 device.
Figure 23:
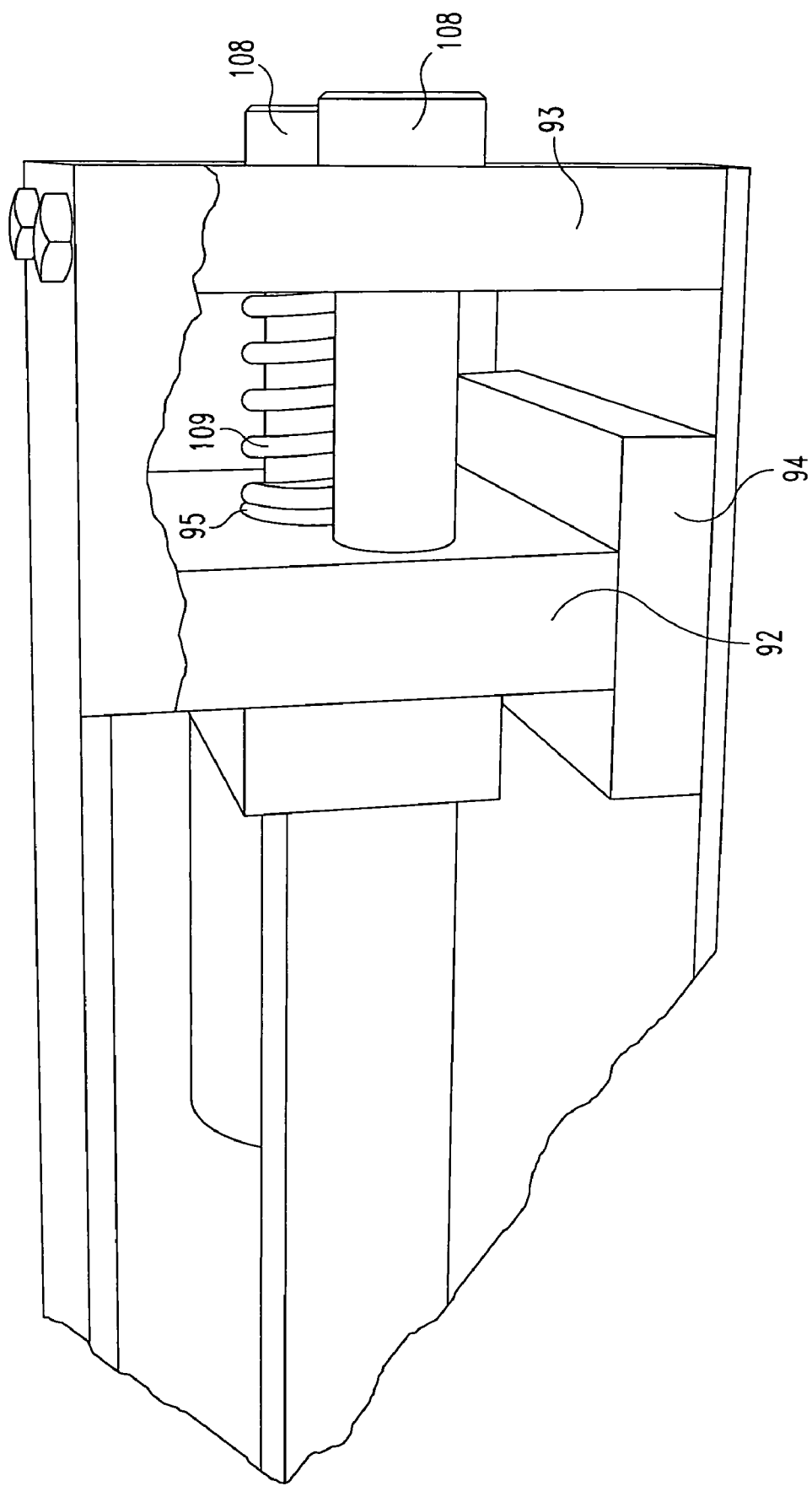
FIG. 23 is a perspective view of one end of the FIG. 1 device showing a spring biasing arrangement for a linear actuator used as part of the FIG. 1 device.

Referring to FIG. 22, it will be seen that pressure plate base 94 includes a pair of counterbored clearance holes 110. Each hole 110 is aligned with a corresponding one of threaded holes 97 in pressure plate 92. The counterbore portion of each hole 110 is used to receive the head of a cap screw in a recessed manner so that surface 111 remains substantially flat and without any protruding fastening hardware. By bolting pressure plate base 94 to pressure plate 92, these two components function together as a single, integral assembly. This assembly is movable as a unit, as will be described in greater detail. The linear actuator 23 is used to deploy the swing arm 21 and this in turn positions the chain wheel 22 against the wheel 26 of the vehicle. Even after such wheel-to-wheel contact is made between chain wheel 22 and wheel 26, the piston shaft 71 of the linear actuator 23 continues to extend. Since the chain wheel 22 cannot move any farther, the force from shaft 71 causes pressure plate 92 (with its base 94) to slide in the direction of back plate 93. This movement uses the sliding fit on the two shoulder bolts 108 for alignment and compresses biasing spring 109. This then maintains a biasing spring force on chain wheel 22 against the wheel 26 of the vehicle while the chain wheel 22 is deployed. The construction and assembly of the components that mount the linear actuator 23 and capture the biasing spring are illustrated in FIG. 23.

Figure 24:
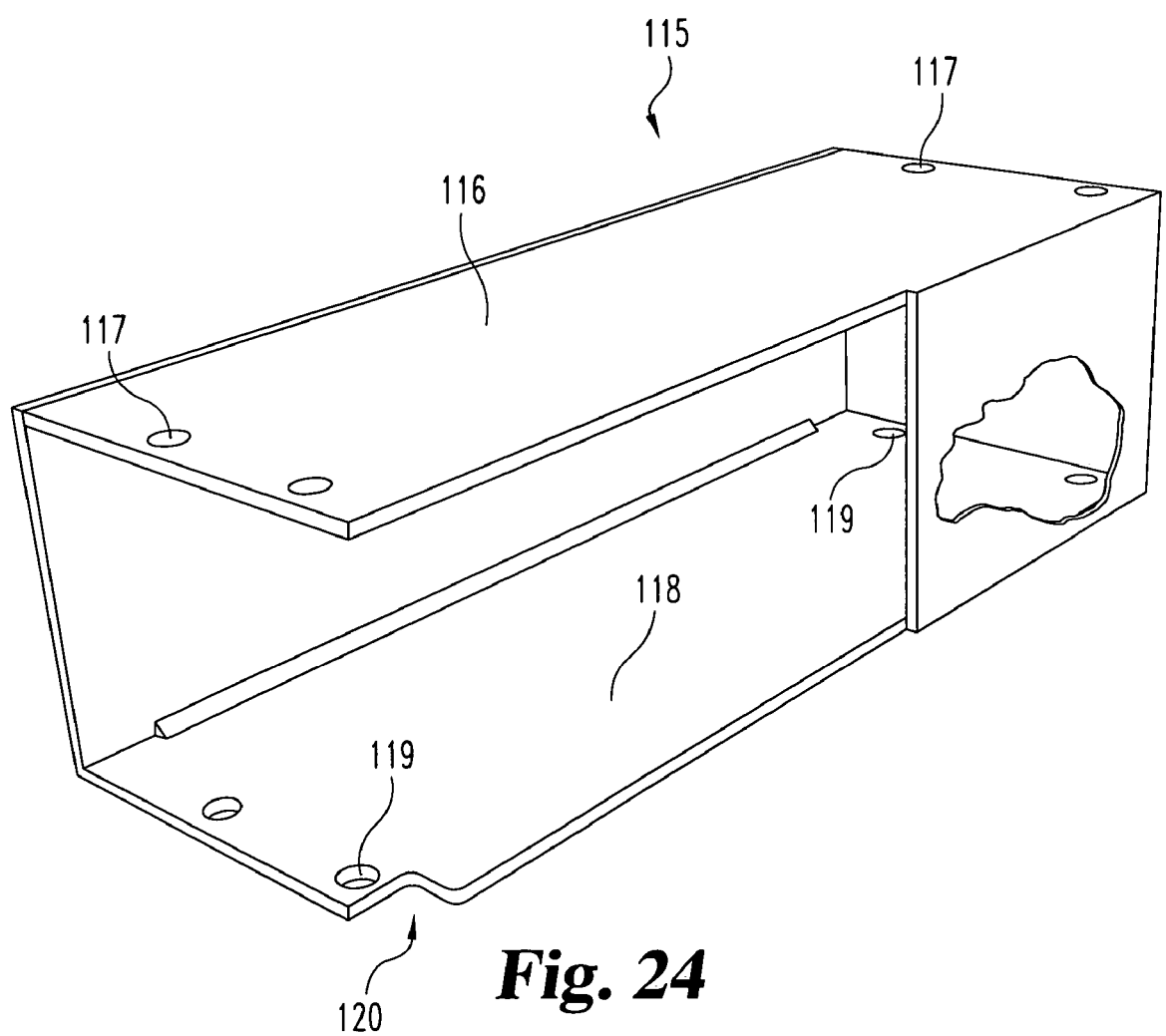
FIG. 24 is a perspective view of a unit cover comprising a portion of the FIG. 1 device.

Referring to FIG. 24, there illustrated a unit cover 115 that encloses the linear actuator and the cooperating plates, biasing spring 109, etc. Note that the fourth side covers only the biasing spring 109. Upper panel 116 includes a four hole pattern of clearance holes 117. Lower panel 118 includes a four hole pattern of clearance holes 119 and a clearance of relief notch 120. Two of the clearance holes 117 and two of the clearance holes 119 are used to receive hex head bolts 121 for mounting unit cover 115 to the top and bottom of back plate 93, using holes 105 and 107, respectively. The remaining two clearance holes 117 and the remaining two clearance holes 119 are used to receive hex head bolts for mounting unit cover 115 to the top and bottom of front guide plate 74 using holes 86*b* and 88*b*, respectively.

In order to enable reliable, durable, and precise performance for device 20, self-lubricating bushings 125 are positioned between piston shaft 71 and sleeve 82 at two, axially spaced-apart locations. Another self-lubricating bushing 126 is positioned between bushing 49 and cap screw 50 and a second bushing 126 is positioned between end 43 of swing arm 21 and cap screw 50. A similar construction using two self-lubricating bushings (not illustrated) is used for the opposite end 59 of double pivot 47 and pivot ears 63. These two bushings are positioned around cap screw 66.

The construction and arrangement of the component parts for device 20 having been described, its operation will now be explained. For this description, FIGS. 1–9 and 23 should be consulted. It should also be noted that device 20 is preferably attached to the axle for the wheel 26 selected (see FIG. 2), using a bracket that attaches to mounting plate 78 by way of mounting holes 78*a*–78*b*.

The starting point for the description of the operation of device 20 is with device 20 in the stowed or at rest condition as illustrated in FIGS. 1, 2, 3, and 7. When it is desired to deploy the chain wheel 22, the electric, linear actuator 23 is activated. This causes the piston shaft 71 to extend outwardly and this pushes on angle joint 46 which in turn applies a force to that end of swing arm 21. The force is applied at the location of hole 44 with the pivot point for swing arm 21 being at the location of hole 45.

Referring to FIGS. 4 and 8, device 20 is positioned at approximately its midpoint of half way point through its deployment cycle. As seen in FIG. 4, the swing arm pivot is able to swing away when the piston shaft advances due to the second pivot point provided by double pivot 47. The double pivot 47 is held in place by the two pivot ears 63. These two pivot ears are welded to the front surface of unit mount 73. A36 steel is suitable for the pivot ears and a thickness of ⅜ inch is preferable for the present invention. The two pivot ears are spaced apart approximately 2⅝ inches. As described, the two pivot point locations in the double pivot each receive a pair of self-lubricating bushings. The angle joint 46 allows for twisting as the piston shaft extends, pushing on swing arm 21.

Referring to FIGS. 5, 6, and 9, device 20 is illustrated in its extended or fully deployed working position. Actually, the piston shaft 71 extends first to a position where the chain wheel 22 contacts the corresponding wheel 26 of the vehicle (see FIG. 5). With links of chain attached, rotation of the vehicle wheel 26 rotates the chain wheel 22 and this sequentially throws one strand of chain and then the next, etc., beneath the vehicle wheel. For the intended operation, continuous pressure by chain wheel 22 on the vehicle wheel 26 is necessary. Consequently, even after there is initial wheel-to-wheel contact, the piston shaft 71 extends slightly farther out from the linear actuator housing. While this additional movement maintains the necessary wheel-towheel pressure, some offset movement of the linear actuator 23 is required. As described, as the piston shaft 71 extends farther, this causes a force pushing back on the linear actuator housing and this in turn causes compression of the biasing spring by the cooperating plates. As illustrated in FIG. 23, the rearward or backward movement of the linear actuator pushes against the pressure plate and the pressure plate, in combination with the pressure plate base, slides in the direction of the back plate 93, and this in turn compresses the biasing spring 109.

When device 20 is properly positioned at the optimum distance from the vehicle tire and the chain wheel is fully deployed, the angle of the swing arm 21 relative to the axial centerline of piston shaft 71 is the same as the angle of the doubled pivot 47 to the axial centerline of the piston shaft 71. This relationship provides a more solid configuration for device 20 and added strength when the device is in its fully deployed or working position (see FIG. 6).

The biasing spring 109 is preferably a 2 inch chrome alloy die spring rated at 352 pounds force. 176 pounds of force are provided at 25 percent deflection of the free length. This force is sufficient for the desired spring biasing force and suitable to keep the chain wheel properly pressed against the vehicle wheel throughout the duty cycle.

A suitable linear actuator 23 for device 20 is a model LAS-1-1-100-12 (as modified) offered by Hiwin Corp. of Mt. Prospect, Ill. and San Jose, Calif. The power requirements for the linear actuator are relatively low (5 amps/unit@ 12 volts dc). This in turn will not adversely affect a vehicle's electrical system. The modifications to the linear actuator include adding approximately 27 mm to the piston shaft length and including internal threads of the end of the piston shaft for connecting to the angle joint 46. The use of the two bushings 125 helps to maintain precise (and rigid) linear motion of piston shaft 71. Of note is the fact that device 20 does not require any external air source and yet remains simple, effective, and relatively maintenance free.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An anti-skid device for use in cooperation with a vehicle wheel for positioning a traction member beneath the vehicle wheel, said anti-skid device comprising:
    a frame assembly constructed and arranged to be attached to a vehicle, said frame assembly including a movable support;
    a swing arm pivotally connected to said frame assembly by way of a double pivot link, said swing arm including a traction wheel with at least one traction member thereon; and
    an electric, linear actuator assembled to said movable support and having an extendable shaft that is assembled to said swing arm by way of a connector, wherein extension of said shaft deploys said swing arm such that said traction wheel is placed against said vehicle wheel.

2. The anti-skid device of claim 1 wherein said traction wheel is connected to said swing arm by a wheel bolt.

3. The anti-skid device of claim 2 wherein said wheel bolt includes an enlarged spherical head.

4. The anti-skid device of claim 3 wherein the connection of said traction wheel to said swing arm includes a receiver plate.

5. The anti-skid device of claim 4 wherein said swing arm includes a mounting end that is attached to said receiver plate.

6. The anti-skid device of claim 1 wherein said swing arm includes a pivot end constructed and arranged with two clearance holes.

7. The anti-skid device of claim 6 wherein a first one of said two clearance holes is used for attaching the swing arm to said connector.

8. The anti-skid device of claim 7 wherein the other one of said two clearance holes is used for attaching the swing arm to said double pivot.

9. The anti-skid device of claim 8 wherein said connector is an angle joint constructed and arranged to enable limited twisting of the swing arm.

10. The anti-skid device of claim 1 which further includes a biasing spring constructed and arranged to maintain contact pressure of said traction wheel against said vehicle wheel.

11. The anti-skid device of claim 10 wherein said movable support includes a pressure plate and said linear actuator is attached to said pressure plate.

12. The anti-skid device of claim 11 wherein said frame assembly includes a back plate and said biasing spring is positioned between said pressure plate and said back plate.

13. An anti-skid device for use in cooperation with, a vehicle wheel for positioning a traction member beneath the vehicle wheel, said anti-skid device comprising:
    a frame assembly constructed and arranged to be attached to a vehicle, said frame assembly including a movable support;
    a swing arm pivotally connected to said frame assembly by a pivot member, said swing arm including a traction wheel with at least one traction member thereon; and
    an electric, linear actuator assembled to said movable support and having an extendable shaft that is assembled to said swing arm by way of a connector, wherein extension of said shaft deploys said swing arm such tat said traction wheel is placed against said vehicle wheel.

14. The anti-skid device of claim 13 wherein said traction wheel is connected to said swing arm by a wheel bolt.

15. The anti-skid device of claim 13 wherein said swing am includes a pivot end constructed and arranged with two clearance holes.

16. The anti-skid device of claim 13 which further includes a biasing spring constructed and arranged to maintain contact pressure of said traction wheel against said vehicle wheel.

17. An anti-skid device for use in cooperation with a vehicle wheel for positioning a traction member beneath the vehicle wheel, said anti-skid device comprising:
    a frame assembly constructed and arranged to be attached to a vehicle, said frame assembly including a movable support;
    a swing arm pivotally connected to said frame assembly by way of a double pivot link, said swing arm including a traction wheel with at least one traction member thereon; and
    a linear actuator assembled to said movable support and having an extendable shaft that is assembled to said swing arm by way of a connector, wherein extension of said shaft deploys said swing arm such that said traction wheel is placed against said vehicle wheel.

18. The anti-skid device of claim 17 wherein said traction wheel is connected to said swing arm by a wheel bolt.

19. The anti-skid device of claim 17 wherein said swing arm includes a pivot end constructed and arranged with two clearance holes.

20. The anti-skid device of claim 17 which further includes a biasing spring constructed and arranged to maintain contact pressure of said traction wheel against said vehicle wheel.

21. An anti-skid device for use in cooperation with a vehicle wheel for positioning a traction member beneath the vehicle wheel, said anti-skid device comprising:
- a frame assembly constructed and arranged to be attached to a vehicle;
- a swing arm pivotally connected to said frame assembly by way of a double pivot link, said swing arm including a traction wheel with at least one traction member thereon;
- an electric, linear actuator having an extendable shaft is assembled to said swing arm by way of a connector, wherein extension of said shaft deploys said swing arm such that said traction wheel is placed against said vehicle wheel; and
- a biasing spring constructed and arranged to maintain contact pressure of said traction wheel against said vehicle wheel, wherein said linear actuator is attached to a movable pressure plate, and wherein said frame assembly includes a back plate and said biasing spring is positioned between said movable pressure plate and said back plate.

* * * * *

UNITED STATES PATENT AND TRADEMARK OFFICE
CERTIFICATE OF CORRECTION

PATENT NO. : 7,118,130 B2 Page 1 of 1
APPLICATION NO. : 10/764220
DATED : October 10, 2006
INVENTOR(S) : Ronald D. Rosenblam It is certified that error appears in the above-identified patent and that said Letters Patent is hereby corrected as shown below:

<u>Column 8,</u>
    Line 39, replace "tat" with -- that-- .

<u>Column 8,</u>
    Line 44, replace "am" with -- arm -- .

Signed and Sealed this

Nineteenth Day of December, 2006

JON W. DUDAS
*Director of the United States Patent and Trademark Office*